United States Patent [19]
Sakai et al.

[11] Patent Number: 5,382,975
[45] Date of Patent: Jan. 17, 1995

[54] IMAGE READING APPARATUS

[75] Inventors: Kazuhiro Sakai; Hiroyuki Miyake; Tsutomu Abe, all of Kanagawa, Japan

[73] Assignee: Fuji Xerox Co., Ltd., Tokyo, Japan

[21] Appl. No.: 935,256

[22] Filed: Aug. 27, 1992

[30] Foreign Application Priority Data

Aug. 30, 1991 [JP] Japan .................................. 3-244169

[51] Int. Cl.⁶ ............................................. H04N 5/335
[52] U.S. Cl. ................................................... 348/241
[58] Field of Search ...................... 358/213.15, 213.16, 358/213.18, 213.19, 213.26, 167; 250/211 J, 208.1; H04N 5/335; 348/241, 243, 246, 294

[56] References Cited

U.S. PATENT DOCUMENTS

| | | | |
|---|---|---|---|
| 3,838,276 | 9/1974 | Mend et al. | 250/211 J |
| 4,461,956 | 7/1984 | Hatanaka et al. | 250/578 |
| 4,591,916 | 5/1986 | Soneda et al. | 358/213.29 |
| 4,953,028 | 8/1990 | Murayama et al. | 358/213.31 |
| 5,023,443 | 6/1991 | Komatsu et al. | 358/213.18 |
| 5,027,176 | 6/1991 | Saika et al. | 357/30 |
| 5,073,828 | 12/1991 | Yamada et al. | 358/482 |
| 5,122,649 | 6/1992 | Murayama et al. | 250/208.1 |

FOREIGN PATENT DOCUMENTS

| | | | |
|---|---|---|---|
| 62-67864 | 3/1987 | Japan | H04N 1/028 |
| 63-44759 | 2/1988 | Japan | H04N 5/335 |

Primary Examiner—Joseph Mancuso
Assistant Examiner—Tuan V. Ho
Attorney, Agent, or Firm—Finnegan, Henderson, Farabow, Garrett & Dunner

[57] ABSTRACT

An image reading apparatus is disclosed which improves reading accuracy by eliminating the effect of crosstalk between neighboring signal lines and removing residual charge, which cause residual images, without complicating the configuration of the image processing circuit. The elimination of the crosstalk effect is based on a relational expression among the electric potentials of three adjacent common signal lines, the load capacitances of the lines, and the coupling capacitances between the center line and each of the outer lines. The residual charge removal uses another relational expression among the scan data from a common signal line, the scan data previously supplied from the same common signal line, and the capacitances of the photodiode section and the wiring section.

16 Claims, 5 Drawing Sheets

IMAGE READING APPARATUS

FIELD OF THE INVENTION

The present invention relates to an image reading apparatus used for facsimile machines, image scanners, digital copiers, or the like, and more particularly to an image reading apparatus improved in reading accuracy by eliminating the effect of crosstalk between neighboring signal lines and by eliminating the effect of residual charge (which causes residual images) from picture elements.

BACKGROUND OF THE INVENTION

One type of image sensor is the TFT (thin-film transistor) drive image sensor, which is a contact-type image sensor that requires less space for the image input unit in facsimile machines, or the like. The TFT drive image sensor is provided with a plurality of thin-film transistors for transferring electric charge generated in photoreceptor elements to wiring capacitances in a matrix wiring configuration on a block-by-block basis (refer to Japanese Patent Laid Open No. Sho 62-67864 (1987)).

Figure 6:
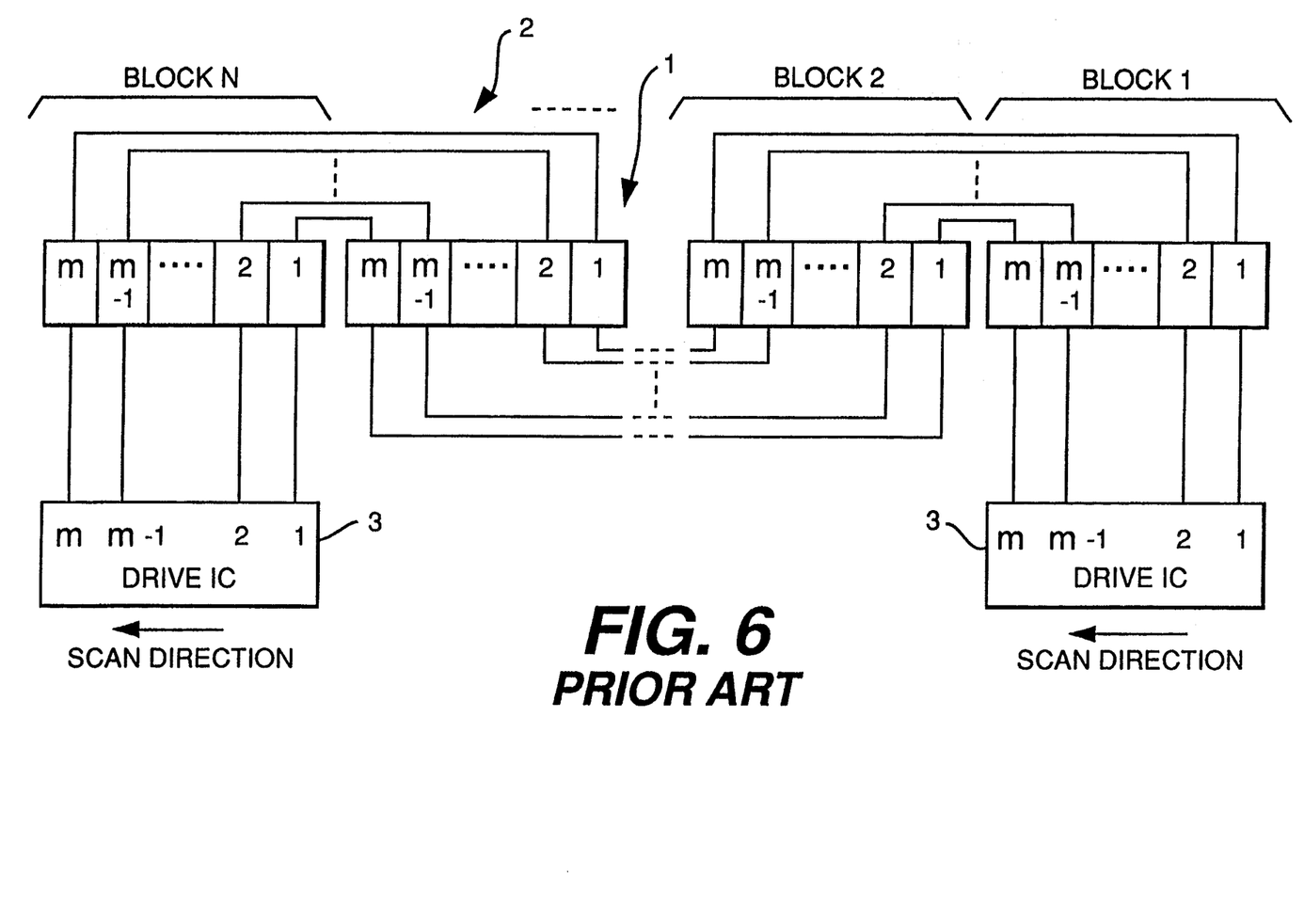
FIG. 6 is a schematic diagram illustrating a wiring arrangement of a conventional image reading apparatus.

A recently proposed TFT driven image sensor employs a wiring arrangement as shown in FIG. 6 with no intersection of signal lines in order to improve image reading accuracy by eliminating crosstalk caused by intersections. This type of image sensor includes a plurality of photoreceptor elements arranged in an array, a plurality of switching elements each coupled with one photoreceptor element, a plurality of signal lines 2 connecting the switching elements in a given block with the switching elements in its immediate right-hand or left-hand block in the order of proximity between two switching elements to be connected, and driver ICs (integrated circuits) 3 receiving the electric charge from the wiring capacitances formed in the signal lines 2. The signal lines 2 between two blocks are spaced apart in the slow scan direction in the order of length, and pairs of signal lines 2 immediately adjacent in the first scan direction are disposed on opposite sides of the photoreceptor array 1 in the slow scan direction, so that the signal lines do not intersect one another.

In general, the intersection crosstalk is attributed to the presence of coupling capacitance formed at the intersections of signal lines. The above image sensor does not suffer from this intersection crosstalk problem, but it introduces a different problem, another kind of crosstalk, which is caused by the presence of very small coupling capacitances between neighboring signal lines because the signal lines extend a considerable distance in parallel. The signal lines therefore affect one another, that is, the potential of a signal line varies with the potential of its neighboring signal line.

Japanese Patent Laid Open No. Sho. 63-44759 (1988) discloses a further improved TFT driven image sensor using the same basic mechanism as above, which includes shielding wires laid between neighboring signal lines to prevent crosstalk therebetween.

However, the shielding wires for isolating neighboring signal lines from each other cannot eliminate all of the crosstalk because the signal lines extend too long to do so, thereby resulting in deterioration of gradation reproducibility of the image sensor. The shielding wires also make the width of the image sensor body in the slow scan direction excessive, consequently bringing about a decrease of the cost performance and the yield.

In addition, the above image sensor has a difficulty that its resolution cannot be improved by increasing the picture element density. Higher density makes a picture element smaller and hence lower in sensitivity, so that the load carrying capacity in the wiring section needs to be smaller accordingly. Small load carrying capacity, in turn, makes it difficult to transfer the electric charge completely out of the photoreceptor elements, thus causing some electric charge to remain therein. The remaining charge give rise to residual images, consequently resulting in inadequate image quality.

SUMMARY OF THE INVENTION

In view of the foregoing, an object of the present invention is to provide a relatively simply configured image reading apparatus improved in reading accuracy by eliminating the effect of crosstalk between neighboring signal lines extending in parallel and by eliminating residual charge in picture elements causing residual images, without making its image processing circuit complex.

According to one embodiment of the present invention, an image reading apparatus incorporating an image sensor with an array of photoreceptor elements each corresponding to a particular picture element comprises an analog-digital (A/D) converter for converting the output supplied by the image sensor into a digital signal, an offset compensator for compensating the output-offset produced by analog-digital conversion, a first memory for storing the output of each picture element from the offset compensator, a second memory for storing the output of each picture element from the first memory, a third memory for storing the output of each picture element from the second memory, first subtracting means for finding the difference between the output of the first memory and the output of the second memory, second subtracting means for finding the difference between the output of the third memory and the output of the second memory, first multiplying means for multiplying the output of the first subtracting means by a predetermined coefficient, second multiplying means for multiplying the output of the second subtracting means by a predetermined coefficient, and adding means for adding the output of the first multiplying means, the output of the second multiplying means, and the output of the second memory.

An advantage of the aforementioned image reading apparatus is accurate image reading enabled by arithmetically eliminating the effect of crosstalk between neighboring signal lines extending in parallel. In the operation for each picture element, the output from the image sensor is first converted into the form of a digital signal by the A/D converter, then offset-compensated in the offset compensator, and then temporarily stored in the three memories one after another so that three pieces of data of three consecutive picture elements are in the three memories. The output of the second memory is subtracted from the output of the first memory in the first subtracting means, and is subtracted from the output of the third memory in the second subtracting means. The differences derived from the first and second subtracting means are multiplied by predetermined coefficients in the first and second multiplying means, respectively. Finally, the outputs from the first and second multiplying means are added to the output of the second memory in the adding means, thus obtaining more accurate image information by compensating for the effect of crosstalk between neighboring signal lines.

According to another embodiment of the present invention, an image reading apparatus incorporating an image sensor with an array of photoreceptor elements comprises an A/D converter for converting the output of the image sensor into the form of a digital signal, an offset compensator for compensating output-offset produced by analog-digital conversion, a first memory for storing the outputs of a predetermined number of picture elements from the offset compensator, a second memory for storing the outputs of a predetermined number of picture elements from the first memory, subtracting means for finding the difference between the output of the first memory and the output of the second memory, multiplying means for multiplying the output of the subtracting means by a predetermined coefficient, and adding means for adding the output of the first multiplying means and the output of the first memory.

In this image reading apparatus, the output from the image sensor is first converted into the form of a digital signal in the A/D converter, then offset-compensated in the offset compensator, and then temporarily stored in two memories sequentially, each of these memories storing the outputs of a predetermined number of photoreceptor elements, pending output to the subtracting means to find the difference between the two outputs from the two memories. The difference is multiplied by a predetermined coefficient in the multiplying means, and added to the output of the first memory. The thus-obtained output allows the image reading apparatus to reproduce an image more accurately with no residual images.

DETAILED DESCRIPTION OF THE PREFERRED EMBODIMENTS

A first embodiment of the present invention will be described below with reference to the accompanying drawings.

An image reading apparatus according to the first embodiment incorporates an image sensor of a type having substantially the same configuration as described previously referring to FIG. 6 with no intersections of signal lines. The image sensor includes an array of photoreceptor elements each coupled with a particular switching element. The switching elements in a given block are connected to the switching elements in its immediate right-hand or left-hand block by signal lines in the order of proximity between two switching elements to be connected to each other. The signal lines are spaced apart in the slow scan direction in the order of length, and pairs of signal lines immediately adjacent in the fast scan direction are disposed on opposite sides of the photoreceptor array in the slow scan direction, so as not to form signal line intersections adversely affecting electric charge stored in wiring capacitances in the signal lines.

Figure 1:
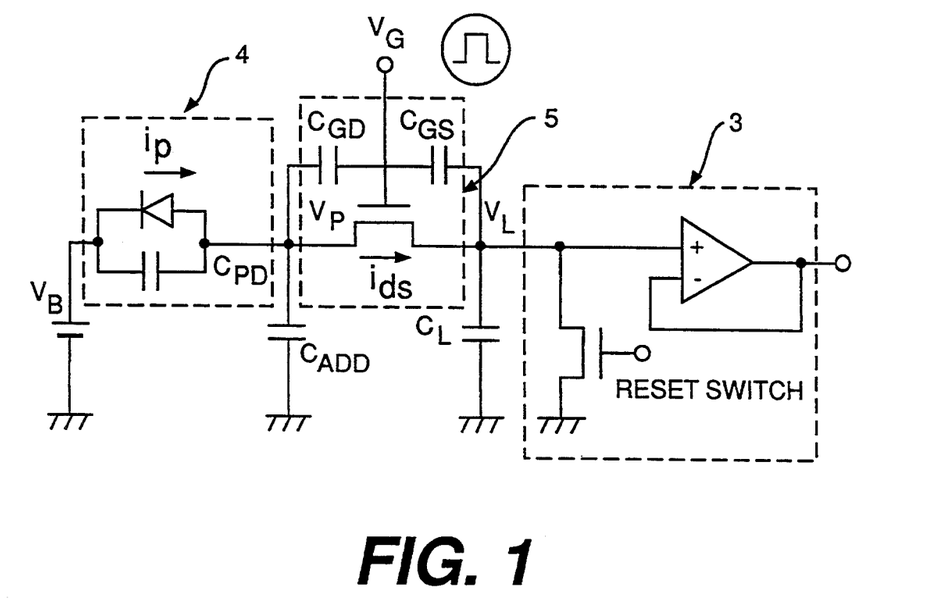
FIG. 1 is an equivalent circuit diagram of the portion of an image sensor corresponding to one picture element according to a first embodiment of the present invention.

FIG. 1 is an equivalent circuit diagram illustrative of the portion of a TFT drive image sensor corresponding to one picture element incorporated in the image reading apparatus of the first embodiment. A description will now be made of the configuration for one picture element of the image sensor and of the charge-reading action of the image sensor, with reference to FIG. 1.

For each picture element of the image sensor, there is a photodiode section 4, a thin-film transistor section 5, and a drive IC 3. The photodiode section 4 is provided with a capacitance means CPD and has a bias voltage VB applied so as to be reverse biased. The TFT section 5 includes a drain electrode, a source electrode, a gate electrode, a capacitance means CGD formed between the gate and drain electrodes, and a capacitance means CGS formed between the gate and source electrodes. These constituent elements are configured and connected so that the gate electrode has a gate voltage VG applied when the TFT is turned on. The source electrode of the TFT section 5 is connected through a common electrode to the drive IC 3 which includes a reset switch. The image sensor also includes an additional capacitor means CADD formed between the photodiode section 4 and the TFT section 5, and a load carrying capacitance CL formed in a common signal line.

The above image sensor reads out electric charge in the following manner. Electrical charge generated in each photodiode section 4 are first stored in the parasitic capacitance CP (CP=CPD+CGD+CADD) on the photodiode end, and then transferred to the load carrying capacitance CL on the common signal line end in response to the TFT energization caused by an 'on' gate signal. The transfer action ceases when the electric charge reach equilibrium, which is followed by the gate signal turning off to allow the drive IC 3 to detect the potential difference of the load carrying capacitance CL which is amplified and output as the image signal. After detection, the electric charge in the common signal line are reset by the action of the reset switch so that the electric potential of the common signal line returns to the ground level to be ready for the next reading action.

Figure 2:
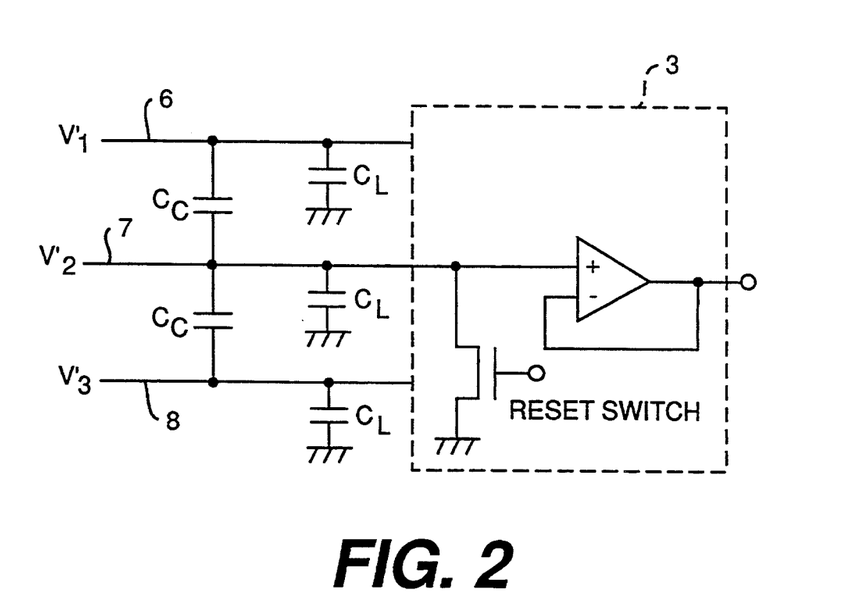
FIG. 2 is a circuit diagram illustrating crosstalk between neighboring signal lines.

Next, the principle of crosstalk between neighboring signal lines will be described with reference to FIG. 2 prior to the description of the configuration for eliminating the effect of crosstalk according to the first embodiment. FIG. 2 is a circuit diagram illustrating crosstalk between neighboring signal lines.

In FIG. 2, the common signal lines 6, 7, and 8 have electric potentials V1', V2', and V3' respectively, which are distorted by crosstalk. The common signal line 7 is taken as an example for the description, and its original electric potential is taken as V2. Electric charge Q transferred into the common signal line 7 are distributed to the load carrying capacitance CL of the common signal line 7 and the coupling capacitances CC formed between the common signal line 7 and the neighboring signal lines 6 and 8.

If the common signal line 7 has no crosstalk with its neighboring signal lines 6 and 8, the electric charge in the common signal line 7 are stored only in the load carrying capacitance CL. With or without crosstalk, the amount of the electric charge Q transferred to the common signal line 7 is the same, so that the following equation holds:

$$CL \times V2 = CL \times V2' + CC \times (V2' - V1') + CC \times (V2' - V3'). \quad (1)$$

Dividing both sides by CL and then substituting $\alpha = CC/CL$ gives:

$$V2 = V2' + \alpha(V2' - V1') + \alpha(V2' - V3'). \quad (2)$$

Based on the above equations (1) and (2), the image reading apparatus of the first embodiment corrects electric potentials distorted by the effect of crosstalk between neighboring signal lines, in order to provide more accurate image information.

Figure 3:
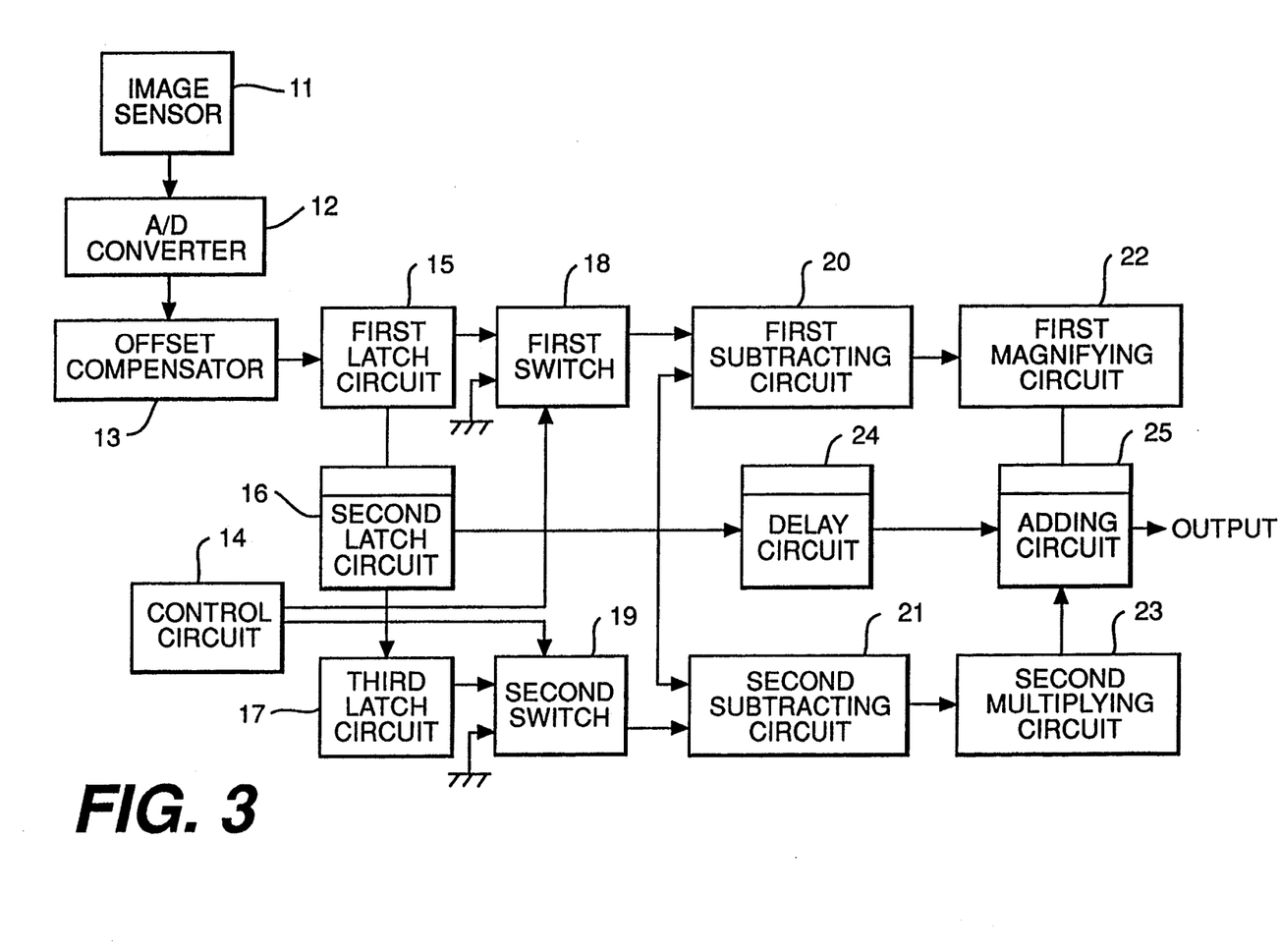
FIG. 3 is a block diagram schematically illustrating the configuration of crosstalk elimination according to the first embodiment.

The configuration of the image reading apparatus according to the first embodiment will now be described with reference to FIG. 3, which is a block diagram for schematically illustrating the configuration of the image reading apparatus.

The image reading apparatus according to the first embodiment comprises an image sensor 11 for outputting detected voltage values as image signals as described previously, an A/D converter 12 for converting the output of the image sensor 11 into the form of a digital signal, an offset compensator 13 for removing noise components (for the dark current), latch circuits (a first latch circuit 15, a second latch circuit 16, and a third latch circuit 17) each temporarily storing the data for each picture element, a first switch 18 and a second switch 19 for resetting the data in the first latch circuit and the third latch circuit respectively to the ground level when necessary, a control circuit 14 for controlling the reset actions of the first switch 18 and the second switch 19, a first subtracting circuit 20 and a second subtracting circuit 21 for finding the difference between the outputs of neighboring latch circuits, a first multiplying circuit 22 and a second multiplying circuit 23 for multiplying the outputs from the subtracting circuits 20 and 21 by a predetermined coefficient, a delay circuit 24 for delaying the output from the second latch circuit 16 so as to synchronize it with the outputs from the multiplying circuits 22 and 23, and an adding circuit 25 for adding the output of the first multiplying circuit 22, the output of the second multiplying circuit 23, and the output of the delay circuit 24.

The above image reading apparatus operates as follows. The image signal supplied by the image sensor 11 in the form of a voltage value is converted from an analog signal into a digital signal of n bits in the A/D converter 12, and sent to the offset compensator 13, where noise components in the output are removed. The compensated output is stored in the first latch circuit 15 temporarily, as a block of eight bits (corresponding to one picture element).

The temporarily stored data value in the first latch circuit 15 is then shifted out to the second latch circuit 16 and stored therein temporarily again. In concurrence with this data shifting, the following data value enters the first latch circuit 15. In a similar way, the data values stored in the second latch circuit 16 and in the first latch circuit 15 are simultaneously shifted out to the third latch circuit 17 and the second latch circuit 16 respectively, the moment third data value enters the first latch circuit 15. Three data values from three adjacent signal lines are thus held in the three latch circuits 15, 16, and 17, and ready for the next process for eliminating the effect of crosstalk.

If the second latch circuit 16 holds the data of the outer signal lines located at the first or last end of the photoreceptor array, the third latch circuit 17 holds the data of the last signal line in the preceding scan line, or the first latch circuit 15 holds the data of the first signal line in the following scan line. In these cases, the control circuit 14 activates the first switch 18 or the second switch 19 to reset the data in the first or third latch circuit so as to obtain ground-level output.

The outputs of the first latch circuit 15 and the second latch circuit 16 are image data values supplied from the image sensor in the form of voltage value for one picture element each and are then converted to a digital representation. The difference between these two outputs ($V2' - V1'$) is found in the first subtracting circuit 20, and then multiplied in the first multiplying circuit 22 by a coefficient $\alpha$ ($\alpha = CC/CL$) that is predetermined as a ratio of the coupling capacitance (CC) between common signal lines and the load carrying capacitance (CL) in the common signal line.

In this manner, the output of the second latch circuit 16 and the output of the third latch circuit 17 are supplied to the second subtracting circuit 21 to find the difference therebetween, and the difference is then multiplied by a predetermined coefficient $\alpha(=CC/CL)$ in the second multiplying circuit 23.

Since the outputs of the first and third latch circuits 15 and 17 are subjected to calculations as described above on their way to the adding circuit 25, the output of the second latch circuit 16 is introduced into the delay circuit 24 to be synchronized with the outputs of the multiplying circuits 22 and 23 toward the adding circuit 25. The adding circuit 25 adds the output $\alpha(V2' - V1')$ of the first multiplying circuit 22 and the output $\alpha(V2' - V3')$ of the second multiplying circuit 23, and the output $V2'$ from the delay circuit 24, to give $V2 = V2' + \alpha(V2' - V1') + \alpha(V2' - V3')$ for more accurate image information having the effect of crosstalk eliminated by the above calculations.

An advantage of the image reading apparatus according to the first embodiment described above is accurate image reading. This is enabled by arithmetically eliminating the effect of crosstalk between neighboring signal lines from the actually read-out image data in such a way that with the first to third latch circuits, the value of $\alpha \times (V2' - V1')$ is determined by the first subtracting and multiplying circuits, the value of $\alpha \times (V2' - V3')$ is determined by the second subtracting and multiplying circuits, and then the value of $V2 = V2' + \alpha(V2' - V1') + \alpha(V2' - V3')$ is determined and output by the adding circuit.

Higher speed processing with no delay circuit is enabled by driving the first subtracting circuit 20, the second subtracting circuit 21, the first multiplying circuit 22, and the second multiplying circuit 23 at a sufficiently high clock frequency compared with that of the image sensor 11.

Much more accurate image information can be obtained by making the subtracting and multiplying circuits perform calculations taking into account not only the mutual effect between neighboring signal lines but also the width of a signal line, the spatial gap between signal lines, and the effects of the inductance and the like of the insulating film where capacitance is formed.

A second embodiment of the present invention for eliminating residual image will now be described. First, however, the principle of residual image occurrence will be described.

Figure 4:
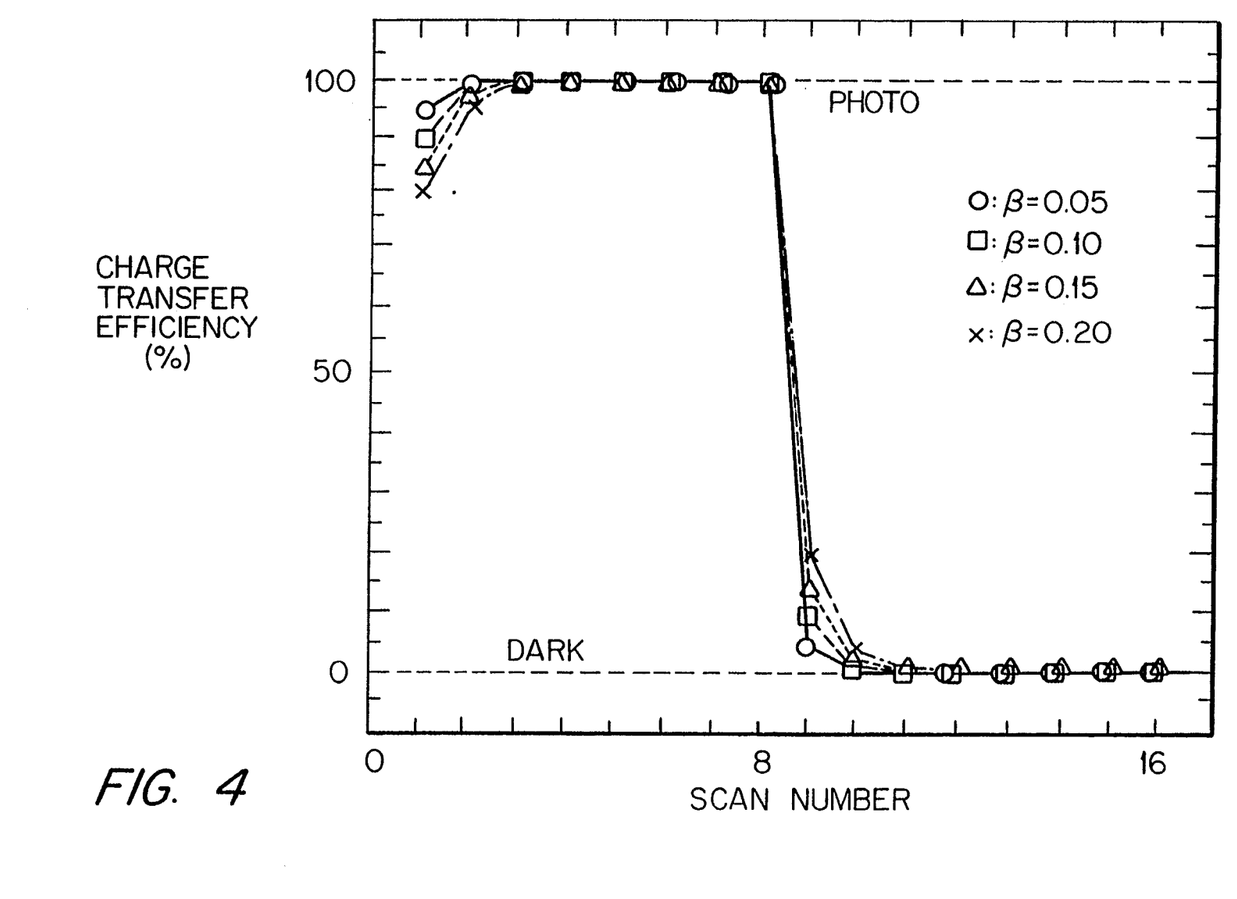
FIG. 4 is a graphical representation of residual image occurrence conditions.

The typical charge-reading method, in which electric charge generated in a photodiode section of an image sensor are transferred to a wiring capacitance and its electric potential is read out, involves the problem that electric charge remains on the photodiode end according to the capacitance ratio between the photodiode capacitance and the wiring capacitance ($CP/CL = \beta$). FIG. 4 shows graphically the residual image occurrence conditions for four different capacitance ratios ($\beta = CP/CL$) between the photodiode capacitance and the wiring capacitance. The y-axis shows the charge transfer efficiency as a percentage, and the x-axis shows successive scan numbers. In the left part of the graph, the light impinges on a white portion of the original, and in the right portion the light impinges on a dark portion of the original.

Taking the initial amount of residual charge as Q0 and the amount of charge generated at the first scan as Q1, the charge Q1' in the photodiode section after the first scan is expressed by $Q1' = Q0 + Q1$. The charge of Q1t transferred thereafter to the signal line end and the charge Q1g remaining in the photodiode end are expressed by:

$$Q1t = CL/(CP+CL) \times (Q0+Q1)$$

$$Q1g = Cp/(CP+CL) \times (Q0+Q1).$$

The output voltage V1' of the signal line is:

$$V1' = Q1t/CL = (Q0+Q1)/(CP+CL).$$

Solving the above equations for Q1g, i.e. the charge remaining on the photodiode end, gives $Q1g = CP \times V1'$.

Similarly, taking the charge generated at the second scan as Q2, the charge Q2' in the photodiode end after the second scan is expressed by $Q2' = Q1g + Q2$. The charge Q2t transferred thereafter to the the signal line end is expressed by:

$$Q2t = CL/(CP+CL) \times (Q1g+Q2).$$

The output voltage V2' of the signal line is:

$$V2' = Q2t/CL = (Q1g+Q2)/(CP+CL) = (CP \times V1' + Q2)/(CP+CL).$$

Rearranging the above equation gives:

$$CP \times V1' + Q2 = V2' \times (CP+CL).$$

Solving the above equation for Q2, i.e. the charge generated at the second scan, gives:

$$Q2 = V2' \times (CP+CL) - CP \times V1' = V2' \times CL + CP \times (V2' - V1').$$

The output voltage V2 corresponding to the generated charge Q2 is expressed by;

$$V2 = Q2/CL = V2' + CP/CL(V2' - V1').$$

Substituting $CP/CL = \beta$ into the above equation gives:

$$V2 = V2' + \alpha(V2' - V1'). \qquad (3)$$

As shown in equation (3), the output voltage V2 corresponding to the generated charge Q2 is determined by three factors: the output voltage V1' detected after the first scan, the output voltage V2' detected after the second scan, and the capacitance ratio $\beta (\beta = CP/CL)$ between the capacitances of the photodiode section and of the wiring section.

The second embodiment of the present invention uses equation (3) as a method of eliminating residual charge causing residual images in order to improve reading accuracy.

Figure 5:
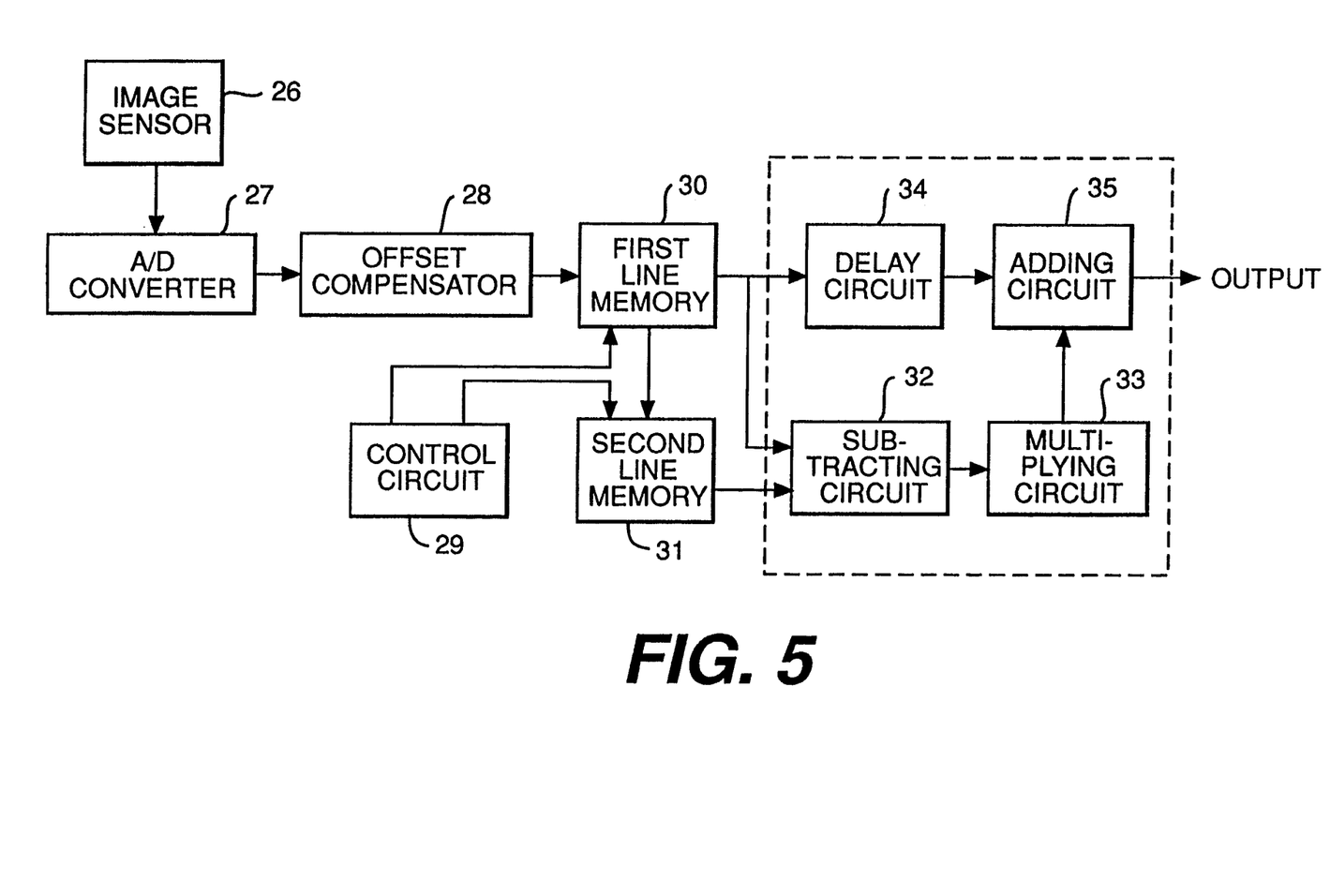
FIG. 5 is a block diagram schematically illustrating the configuration for removing residual charge according to a second embodiment of the present invention.

An image reading apparatus according to the second embodiment will now be described referring to FIG. 5, which is a block diagram schematically illustrating the configuration of the image reading apparatus of the second embodiment.

The image reading apparatus according to the second embodiment comprises an image sensor 26 outputting detected voltage values as image signals, an analog-digital converter 27 for converting the output of image sensor 26 into a digital representation, an offset compensator 28 for removing noise components, a first line memory 30 and a second line memory 31 each for temporarily storing the outputs of m picture elements corresponding to one scan line, a control circuit 29 performing control functions so that each line memory stores the data for m picture elements, a subtracting circuit 32 for finding the difference between the outputs of the two line memories, a multiplying circuit 33 for multiplying the output of the subtracting circuit 32 by a predetermined coefficient, a delay circuit 34 for delaying the output of the first line memory 30 so as to synchronize it with the output from the multiplying circuit 33, and an adding circuit 35 for adding the output of the delay circuit 34 and the output of the multiplying circuit 33.

The above image reading apparatus operates as follows. The outputs of the image sensor 26 which are image signals represented by voltage values are converted from analog signals into digital signals of n bits in the analog-digital converter 27, then supplied to the offset compensator 28 to remove noise components. The compensated output is stored temporarily in the first line memory 30 pending simultaneous output to the second line memory 31, the subtracting circuit 32, and the delay circuit 34.

The first line memory 30 and the second line memory 31 are shift registers, which are controlled by the control circuit 29 so that each stores the data for m picture elements corresponding to one scan line.

The output of the first line memory 30 and the output of the second line memory 31, which is the data for the preceding scan line, are supplied to the subtracting circuit 32 to find the difference therebetween (V2' − V1'), which is then multiplied by a predetermined coefficient $\beta$ in the multiplying circuit 33, the coefficient $\beta$ being determined by the ratio between the photodiode capacitance and the common signal line capacitance ($\beta = CP/CL$). The output of the first line memory 30 is also supplied to the delay circuit 34 in order to synchronize it with the output of the multiplying circuit 33 to the adding circuit 35. The output, $\beta \times (V2' - V1')$, of the multiplying circuit 33 is added to the output, V2', from the first line memory 30 in the adding circuit 35, to give V2=V2'+β×(V2'−V1') for the output V2 having residual images eliminated.

An advantage of the above image reading apparatus according to the second embodiment is accurate image reading. Higher accuracy is achieved by arithmetically eliminating residual charge causing residual images in such a way that with the first and second line memories, the value of the difference, V2'−V1, is determined by the subtracting circuit, the value of β×(V2'−V1') is determined by the multiplying circuit, and then the value of V2=V2'+β×(V2'−V1') is determined and output by the adding circuit.

What is claimed is:

1. An image reading apparatus comprising:
    a plurality of photoreceptor elements aligned in a fast scan direction;
    a plurality of switching elements each connected to one of said photoreceptor elements, said switching elements transferring electric charge generated in said photoreceptor elements;
    a plurality of wiring conductors each connected to one of said switching elements having corresponding wiring capacitances for storing electric charges; and
    correcting means for correcting spatiotemporal capacitance-related errors in outputs from said wiring conductors, said correcting means correcting the output from each of said wiring conductors according to an output previously supplied from the same wiring conductor,
    said correcting means evaluating V2=V2'+β(V2'−V1') for an output value V2, where V2' is the output from each of said wiring conductors to be corrected, V1' is the output previously supplied from the same wiring conductor, and β is a ratio between a capacitance of said photoreceptor elements (CP) and a capacitance of said wiring conductors (CL), the ratio β being equal to CP/CL.

2. An image reading apparatus according to claim 1, wherein said correcting means corrects the outputs from said wiring conductors according to a crosstalk effect between said wiring conductors and adjacent wiring conductors.

3. An image reading apparatus according to claim 2 further comprising an additional wiring conductor positioned outside of said wiring conductors.

4. An image reading apparatus according to claim 3, wherein said additional wiring conductor is at a fixed potential.

5. An image reading apparatus comprising:
    a plurality of photoreceptor elements aligned in a fast scan direction;
    a plurality of switching elements each connected to one of said photoreceptor elements, said switching elements transferring electric charge generated in said photoreceptor elements;
    a plurality of wiring conductors each connected to one of said switching elements having corresponding wiring capacitances for storing electric charges; and
    correcting means for correcting spatiotemporal capacitance-related errors in outputs from said wiring conductors, said correcting means correcting the outputs from said wiring conductors according to crosstalk effects between said wiring conductors and adjacent wiring conductors, said correcting means evaluating an output value V2 as $$V2 = V2' + \alpha(V2' - V1') + \alpha(V2' - V3')$$

where V2' is an output from each of said wiring conductors to be corrected, V1' and V3' are outputs from the adjacent wiring conductors, and α is a ratio between a load capacitance of each of said wiring conductors (CL) and a coupling capacitance between each of said wiring conductors and the adjacent wiring conductors (CC), the ratio α being equal to CC/CL.

6. An image reading apparatus according to claim 5, further comprising an additional wiring conductor positioned outside of said wiring conductors.

7. An image reading apparatus according to claim 6, wherein said additional wiring conductor is at a fixed potential.

8. An image reading apparatus according to claim 5, wherein said correcting means corrects the output from each of said wiring conductors according to an output previously supplied from the same wiring conductor.

9. An image reading apparatus comprising:
    a plurality of photoreceptor elements aligned in a fast scan direction;
    a plurality of switching elements each connected to one of said photoreceptor elements, said switching elements transferring electric charge generated in said photoreceptor elements;
    a plurality of wiring conductors, each connected to one of said switching elements, having corresponding wiring capacitances for storing electric charges; and
    correcting means for correcting spatiotemporal capacitance-related errors in outputs from said wiring conductors, said correcting means correcting the outputs from said wiring conductors according to crosstalk effects between said wiring conductors and adjacent wiring conductors, said correcting means comprising:
    a first memory for storing the output from each of said wiring conductors;
    a second memory for storing an output of said first memory;
    a third memory for storing an output of said second memory;
    first subtracting means for determining a difference between the output of said first memory and the output of said second memory;
    a second subtracting means for determining a difference between the output of said second memory and an output of said third memory;
    first multiplying means for multiplying an output of said first subtracting means by a first predetermined coefficient;
    second multiplying means for multiplying an output of said second subtracting means by a second predetermined coefficient; and
    adding means for adding an output of said first multiplying means, an output of said second multiplying means, and the output of said second memory.

10. An image reading apparatus according to claim 9, further comprising an additional wiring conductor positioned outside of said wiring conductors.

11. An image reading apparatus according to claim 10, wherein said additional wiring conductor is at a fixed potential.

12. An image reading apparatus according to claim 9, wherein said correcting means corrects the output from each of said wiring conductors according to an output previously supplied from the same wiring conductor.

13. An image reading apparatus comprising:
- a plurality of photoreceptor elements aligned in a fast scan direction;
- a plurality of switching elements, each connected to one of said photoreceptor elements, said switching elements transferring electric charge generated in said photoreceptor elements;
- a plurality of wiring conductors, each connected to one of said switching elements, having corresponding wiring capacitances for storing electric charges; and
- correcting means for correcting spatiotemporal capacitance-related errors in outputs from said wiring conductors, said correcting means corrects the output from each of said wiring conductors according to an output previously supplied from the same wiring conductor, said correcting means comprising:
  - a first memory for storing an output from each of said photoreceptor elements;
  - a second memory for storing an output from said first memory;
  - subtracting means for determining a difference between the output from said first memory and an output from said second memory;
  - multiplying means for multiplying an output from said subtracting means by a predetermined coefficient; and
  - adding means for adding an output from said multiplying means to the output from said first memory.

14. An image reading apparatus according to claim 13, wherein said correcting means corrects the outputs from said wiring conductors according to a crosstalk effect between said wiring conductors and adjacent wiring conductors.

15. An image reading apparatus according to claim 14, further comprising an additional wiring conductor positioned outside of said wiring conductors.

16. An image reading apparatus according to claim 15, wherein said additional wiring conductor is at a fixed potential.

* * * * *